(No Model.) 3 Sheets—Sheet 1.
E. E. WHIPPLE.
HARROW.
No. 600,659. Patented Mar. 15, 1898.
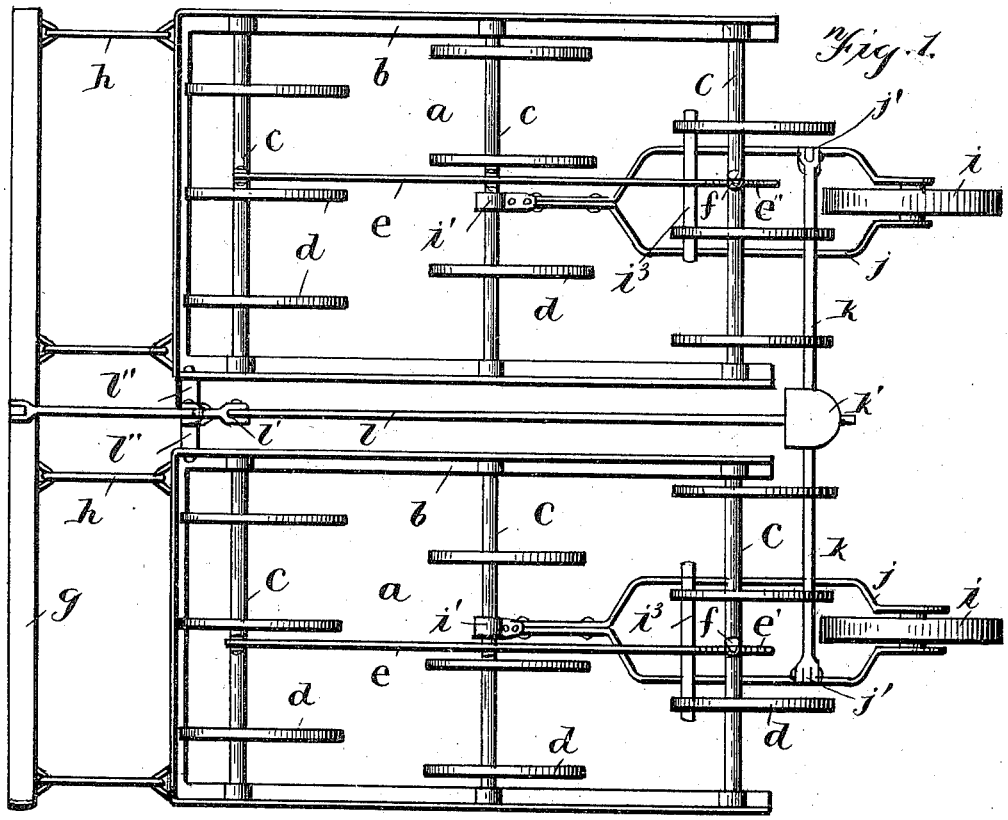
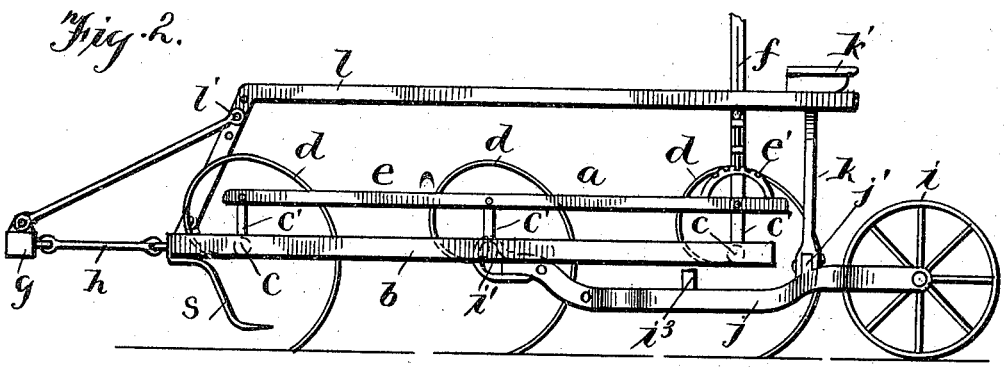
Witnesses
Geo. E. Fuch.
Chas. R. Wright Jr.
Inventor
E. E. Whipple
Rev Hubert E Peak
Attorney (No Model.) 3 Sheets—Sheet 2.

E. E. WHIPPLE.
HARROW.

No. 600,659. Patented Mar. 15, 1898.

Witnesses
Geo. E. Frech.
Chas. P. Wright Jr.

Inventor
E. E. Whipple
per Hubert E. Peck
Attorney

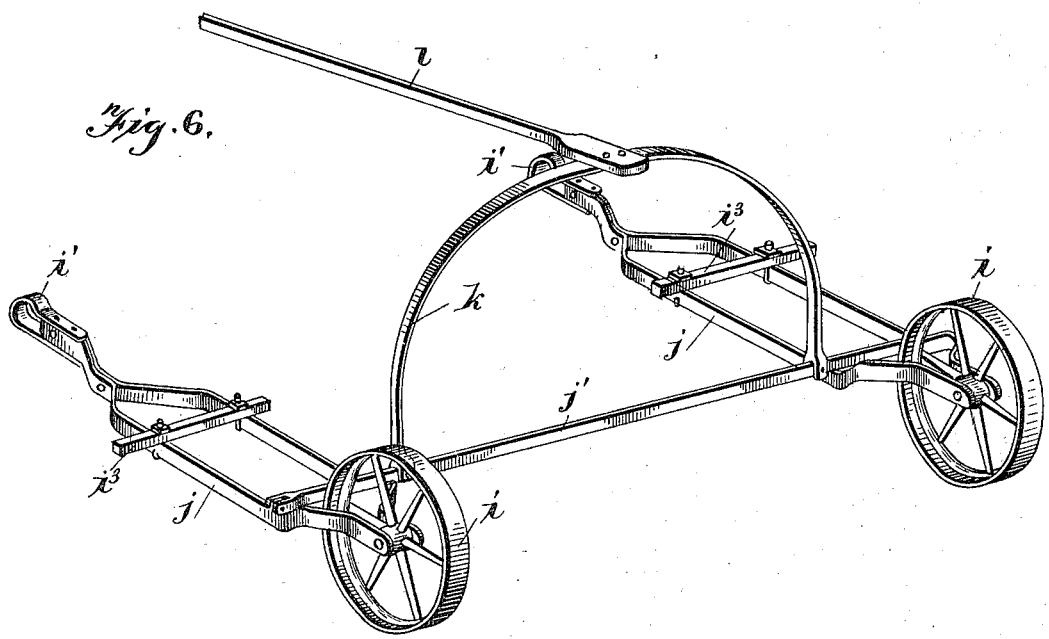

UNITED STATES PATENT OFFICE.

EFFINGER E. WHIPPLE, OF COOPERSTOWN, NEW YORK.

HARROW.

SPECIFICATION forming part of Letters Patent No. 600,659, dated March 15, 1898.

Application filed November 30, 1896. Serial No. 613,998. (No model.)

*To all whom it may concern:*

Be it known that I, EFFINGER E. WHIPPLE, a citizen of the United States, residing at Cooperstown, in the county of Otsego and State of New York, have invented certain new and useful Improvements in Harrows; and I do hereby declare the following to be a full, clear, and exact description of the invention, such as will enable others skilled in the art to which it appertains to make and use the same.

This invention relates to certain improvements in riding or supporting attachments for harrows and like implements.

Among other novel features hereinafter pointed out and claimed I claim to be the first to have invented the combination of a wheeled attachment connected and drawn with a harrow carrying supporting means and a curved-spring-tooth harrow supported and carried on the riding attachment when the harrow-teeth are in or out of operative engagement with the soil, leaving the independent harrow-sections free to move and operate as a float-harrow above the plane of the support and independent of the wheeled attachment, combining the advantages of a float and wheel harrow.

The invention consists in certain novel features of construction and in combinations and arrangements of parts, as more fully and particularly pointed out and described hereinafter.

Figure 3:
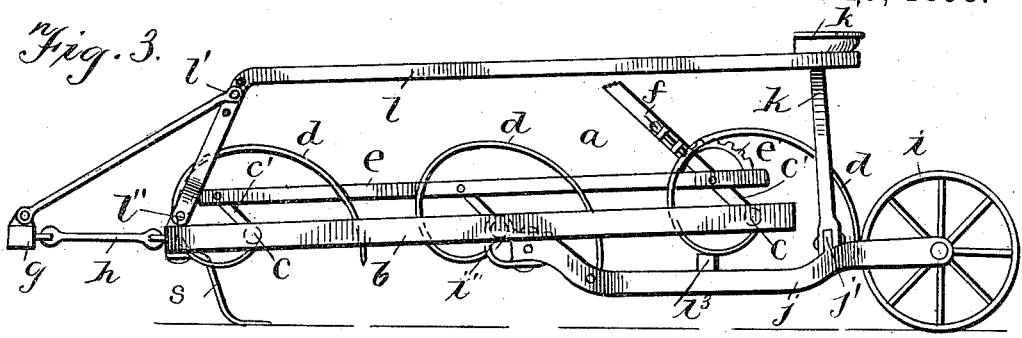
Figure 4:
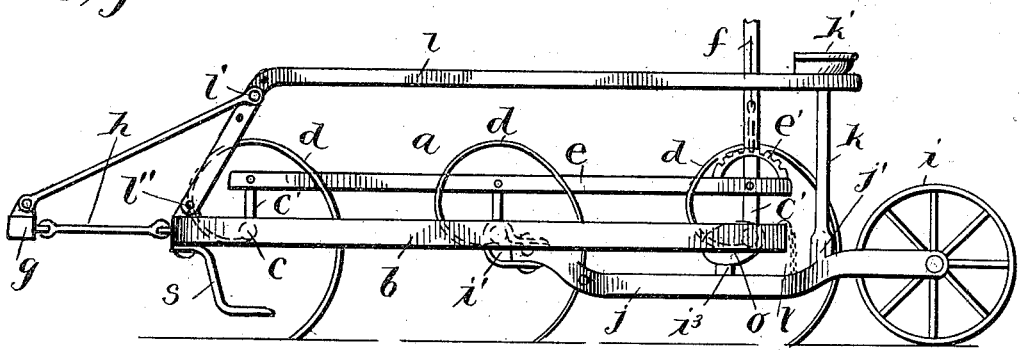
Figure 5:
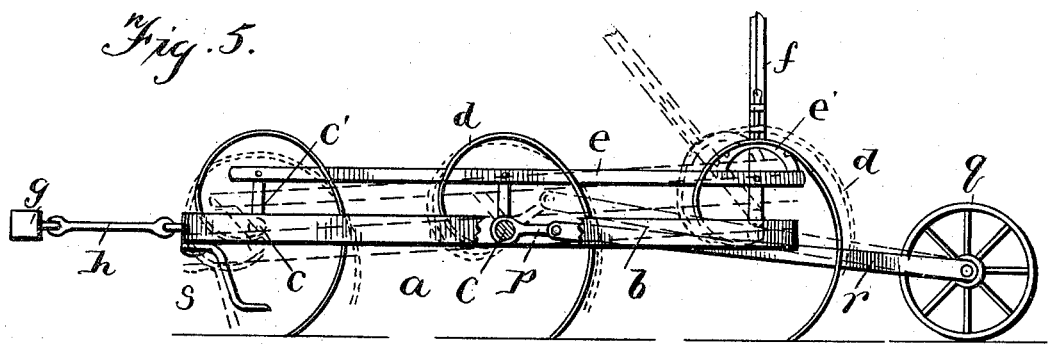

Referring to the accompanying drawings, Figure 1 is a top plan view of a two-section harrow provided with one form of the present invention, the teeth being shown in operative adjustment. Fig. 2 is a side elevation, the teeth being shown in operative adjustment. Fig. 3 is a side elevation with the teeth raised out of operative position and the rear end of the harrow carried by the wheeled support. Fig. 4 is a side elevation of a harrow with a wheeled support, showing my invention arranged in a different manner for throwing the rear end of the harrow onto the support when the teeth are raised, dotted lines showing different adjustments of the parts. Fig. 5 is a side elevation of a lever-adjustment harrow with a rear wheeled support, wherein a cam is provided on a rear tooth-bar to throw the weight of the rear end of the harrow on the wheeled support when the teeth are raised. Fig. 6 is a detail view of the supporting attachment adapted for coupling to a two-section lever-adjustment harrow or the like.

The harrow shown in Fig. 1 has two sections $a\ a$; but my invention is not limited to employment with a harrow of any particular number of sections, but can be adapted to various kinds of harrows having one or more sections.

$b$ is the harrow-frame, having the turnable tooth-bars $c$ mounted therein and carrying the curved spring harrow-teeth $d$.

$e$ is the adjusting-bar, extending over the tooth-bars and pivotally joined to the rigid arms $c'$ from the tooth-bars.

$f$ is the adjusting-lever, rigid with a rear tooth-bar and pivotally joined to the adjusting-bar $e$ and carrying a spring-controlled pawl to engage the teeth of a rack $e'$, rigid with the adjusting-bar. The tooth-bars are turned simultaneously by the upright hand-lever $f$ to either raise or lower the teeth, and all are locked in the desired adjustment by the pawl of the lever engaging the rack of the adjusting-bar.

$g$ is an evener-bar arranged in front of and loosely coupled to the front ends of the various harrow-sections.

Suitable draft attachments, such as $h$, are arranged in advance of and loosely coupled to the evener-bar $g$, to which the draft-animals are hitched.

Referring to Figs. 1, 2, and 3, $i$ are the wheels, connected to the wheeled attachment. Each wheel is mounted in a supporting-frame $j$, extending forwardly and horizontally from its wheel between the harrow-teeth and below a frame member, and at its front end loosely connected to the harrow, as by a swivel-joint $i'$, connecting the front end of said supporting-frame to a part of the frame in advance of the rear tooth-bar. The front end of the frame can be loosely attached to any desired part of the harrow in front of the rear tooth-bar.

In a two or more section harrow a frame $j$ is provided for each section, with the supporting-wheel in the rear end thereof and in rear of the section. The several supporting-frames $j$ can be rigidly connected by a rigid cross-bar $j'$ in rear of the harrow.

If it should be desired that the rear wheeled support also constitute a riding attachment, the vertical arch $k$ is at its lower ends secured to the frames $j$ in rear of the harrow-sections and is provided with a seat $k'$ at its top, and a rigid tongue or draft connection $l$ is at its rear end rigidly secured to the center of the arch and extended forwardly above the harrow with its front end deflected down and loosely coupled to the front ends of the harrow-section frames at $l''$. A connection $l'$ is secured to an elevated point in vertical adjustment at the front end of the tongue $l$ and extended down to the draft attachments $g$, such as the evener or draft bar, so that the front end of the harrow will be held down to perform its proper work. This tongue throws the draft of the rear wheeled attachment directly to the draft attachments of the harrow and avoids draft on the connections between the rear supports $j$ and the harrow, so that the harrow when adjusted to operate can swing laterally and play vertically over the surface of the ground independently of the wheeled attachment and by reason of the swivel connections between said supports and the harrow.

The wheeled supporting-frame $j$, extending beneath one or more tooth-bars, is so combined and arranged with a tooth-bar that when the harrow-teeth are in operative adjustment the harrow is not confined by the wheeled support, but can swing laterally and move vertically over the surface of the ground independently of and above the support and without correspondingly moving or swaying the support, and yet so that when the tooth-bars are adjusted to raise the teeth the weight of the rear end of the harrow will be thrown onto said support. This function and combination can be obtained in various ways, a few among many examples being given as follows:

In Figs. 1, 2, and 3 certain teeth on a tooth-bar over the supports of the wheeled attachment are shown arranged to have a cam action on the supports to raise and lower the rear end of the harrow and thereby throw the weight of the harrow onto said support or entirely relieve the support of the weight of the harrow. The front curved portion of certain teeth on a rear tooth-bar are arranged over the cross-support $i^3$, so that when the teeth have their points lowered in operative adjustment said curved portions of the teeth are a distance above and out of contact with the cross-supports $i^3$, and so that when the hand-operating lever is thrown forward and the tooth-bars rocked to raise the teeth the front curved portions of the teeth will move down onto said frames $l$ and have a cam action in raising the rear end of the harrow on said frames, so that the wheeled supports or frames will entirely support and carry the rear ends of the harrows through the medium of certain teeth and tooth-bars.

If desired, shoes S or any other suitable supports can be arranged at the front end of the harrow when the rear end thereof is elevated on the wheeled support.

Each support $j$ is shown in Fig. 1 as formed of two separate side bars brought together at their front ends and having the supporting-wheel arranged between their rear ends.

If desired, the cross-bars $i^3$ can be secured rigidly to said side bars of each support $j$ beneath the curved front portions of the teeth to form the engaging or bearing surface of the support which receives the cam action of the teeth. By this arrangement two or more teeth of a section engage and act on the support of the section and thus hold the section against lateral tilting when elevated on the support. However, I do not wish to limit my invention to the employment of the cross-bars $i^3$, as various other arrangements can be employed.

In Fig. 5 cams $o$ are provided rigid on the rear tooth-bar to engage the support and raise the rear end of the harrow thereon when the tooth-bars are rocked to raise the teeth. When the cams are employed, the teeth are arranged so as not to engage the wheeled support; otherwise the cams act substantially as the teeth in their cam action, as previously described.

In Fig. 5 a tooth-bar in advance of the rear tooth-bar is provided with a rigid arm $p$, rigid with and extending laterally from the bar and so arranged that when the teeth are adjusted to their operative lowered position the said arm will extend about horizontally or with a downward inclination rearwardly from the tooth-bar, and hence will swing upwardly as the tooth-bars are rocked to raise the teeth from operative position. The support has the rear supporting-wheel $q$ and the support $r$ at its rear end, carried by the wheel and from thence extending forwardly beneath the rear tooth-bar and at its front end loosely and yet strongly connected to the rear end of said arm $p$. When the teeth are in operative adjustment, the arm $p$ holds the support down out of engagement with the tooth bar or bars beneath which it is located. When the tooth-bars are rocked to raise the teeth from operative position, the arm $p$ moves up and carries the support up against a rear tooth-bar, and as the arm $p$ continues to move up the said support raises the rear end of the harrow through the medium of the rear tooth-bar or some other portion of the harrow which can be engaged by the support in its upward movement. Hence when the draft is applied to the front end of the harrow the rear end thereof is supported on and carried by the wheeled attachment.

The supports can be vertically adjustable, if so desired, and, if desired, separate wheeled supports can be provided for each harrow-section with one or more wheels and without coupling the supports together, as shown in Fig. 1, and also the supports can be used with or without the riding attachment and tongue extending over the harrow and coupled to the evener-bar, and also if the riding attachment is employed the wheeled supporting-frame could be rigidly supported from the tongue of the riding attachment without being loosely connected to an intermediate or forward portion of the harrow, so as to sustain the strain of the cam action of a turning part and to sustain the weight of the rear portion of the harrow.

If desirable, the weight of the wheeled support can be thrown onto the harrow when the same is in operative adjustment and to hold the teeth down in certain kinds of soil by any suitable detachable connection, such as t, between the support and a portion of the harrow above, as shown by dotted lines in Fig. 4.

If the arm rigid with a tooth-bar is not employed, the front end of the trailing supporting-frame can be loosely secured to a tooth-bar or the frame or otherwise arranged to extend beneath a rear portion of the harrow and thus stop the downward movement of the harrow-frame and support it from the ground and uphold its rear end when the teeth are elevated and the harrow settles down.

One or more wheeled supports can be provided for each harrow-section, and they can be arranged and coupled in any suitable manner, so that the rear end of the frame or a rear tooth-bar will settle down on and be upheld by support or supports.

If desired, wheeled frames can be provided loosely coupled at their front ends to a front or forward part of the harrow, with their wheels arranged between the teeth either in front of or behind a rear tooth-bar and capable of lateral swing between and which is limited by the teeth and so that the several supports are independent of each other.

The wheeled supports are so connected to the harrow as to hold the wheels upright, yet permit their lateral play beneath the teeth when the tooth-bars are raised from the supports.

It is preferable to have the supporting-wheels arranged at some point in rear of the center of the harrow, with the supporting-frames loosely coupled to the harrows at points a sufficient distance in advance of the supporting-wheels to permit raising of the harrow-frame high enough to clear it of trash, &c., without throwing the weight of the wheeled support onto the harrow or necessitating raising of the supporting-wheels with the harrow.

The wheeled attachment might be located within the frame, with a depending support, such as a shoe, to balance the harrow if it should tilt forward or back on the attachment so located.

If desired, an arched axle can be employed to connect the frames $j\,j$ and carry the draft-tongue and seat instead of the bar and arch $k$.

The various operations of the harrow illustrate some of the numerous and various means within the scope of my invention which can be employed for carrying the harrow-frame in different horizontal planes above the soil whether the harrow-teeth are in or out of operative engagement with the soil, leaving the harrow free to move above the plane of the support without the weight of the wheeled attachment.

Fig. 6 of the drawings indicates an independent wheeled attachment for use with any float-harrow. The rigid draft-tongue is attached to the draft of the harrow or the front part of the frame, and the rear of the draft-tongue is supported on the wheel-bearing axle. It is obvious that the supports which connect the middle bar of the harrow can be omitted down to the cross-bar $i^3$, and by this arrangement the forwardly-projecting supports would rest under the section-frames, usually under the rear tooth-bar of each section-frame of the harrow, and would be sufficient to carry the rear of the harrow in an elevated position, so that when the teeth were in or out of engagement with the ground the rear of each section of the frame would be carried by such support, engaging and supporting the harrow and permitting vertical movement of the harrow-sections independently above the plane of the support. When the teeth are put into engagement with the soil, the rear of the harrow would be free to oscillate and follow the unevenness of the ground, making it distinctly a float-harrow with an independent riding attachment.

It is evident that various changes might be made in the forms, constructions, and arrangements of the parts described without departing from the spirit and scope of my invention. Hence I do not wish to limit myself to the constructions disclosed and specifically described.

What I claim is—

1. A rocking tooth-bar harrow composed of two or more distinct sections provided with curved spring harrow-teeth, having depending front supports, in combination with a wheeled support coupled to the harrow in advance of its rear end and located at the after part thereof, whereby the harrow can play freely independently of the support, when its teeth are in or out of operative adjustment, said support limiting the downward movement of and supporting the rear end of the harrow through the medium of a rear tooth-bar opposite which the support extends, substantially as described.

2. A wheeled attachment for a harrow having a rocking member, said attachment having a support loosely connected with the harrow to permit free play of the harrow when in operative adjustment and adjacent to said rocking member, so that when the member is rocked in one direction it rides up on the support with a cam action and thereby holds and partially supports the harrow on the support, substantially as described.

3. A rocking tooth-bar harrow having curved spring-teeth, combined with a wheeled attachment provided with a support extending horizontally under a rear tooth-bar, and means whereby the rear end of the harrow is raised and supported on said wheeled support when the tooth-bars are rocked to raise the teeth from the ground, substantially as described.

4. A sectional harrow, each section provided with rocking tooth-bars and curved spring-teeth, depending supports at the front of each section to carry the frames above the ground, in combination with an independent wheeled attachment having the draft-tongue connected at its front to the draft of the harrow and at its rear to the wheel-axle, and horizontal means, substantially as set forth, extending forwardly under or into engagement with the body of each section for carrying the rear of each section in elevated position, and at the same time to leave the rear of each section free to oscillate or move on the surface of the ground when the harrow is in use and to carry the rear of the frame when the teeth are elevated.

5. A rocking tooth-bar harrow, having a curved or cam-shaped member on a tooth-bar, in combination with a wheeled attachment having a support extending forwardly beneath said tooth-bar so that said member will ride on the support.

6. A rocking tooth-bar harrow having curved harrow-teeth, in combination with a wheeled attachment having a support connected with the harrow and extending adjacent a rear tooth-bar so that one or more teeth will ride on said support.

7. A rocking tooth-bar harrow, in combination with a wheeled attachment comprising a horizontally-disposed support at its front end having a swivel connection with the harrow in advance of its rear end and at its rear end a supporting-wheel, said frame extending beneath a portion of the harrow, substantially as described.

8. A rocking tooth-bar harrow, in combination with a wheeled attachment comprising a supporting-frame having a supporting-wheel at its rear end and extending forwardly beneath a tooth-bar and at its front end loosely coupled to the harrow, said tooth-bar having a cam arranged to engage the supporting-frame and raise the harrow thereon when the tooth-bars are operated to raise the teeth, substantially as described.

9. A rocking tooth-bar harrow having a tooth-bar provided with a lateral arm, in combination with a wheeled support extending beneath and normally out of engagement with a rear portion of the harrow and at its front end loosely coupled to said arm so that when the tooth-bars are rocked to raise the teeth said arm raises the support against said rear portion of the frame and thereby raises the rear end of the frame and carries it on the wheeled support, substantially as described.

10. A several-section rocking tooth-bar harrow, in combination with a horizontally-disposed support having a wheel at its rear end and extending forwardly beneath a rear tooth-bar and at its front end having a loose swivel connection with a forward tooth-bar, each section having such a wheeled support, all of which are united by a cross-bar, each support having a cross-bar beneath the front portions of several teeth on said rear tooth-bar, a vertical arch secured to said supports and carrying a seat, and a draft-tongue from said arch over the harrow and connected with the draft connections of the harrow, substantially as described.

11. A harrow comprising two or more sections having draft attachments at the front, in combination with a wheeled riding attachment having the central tongue rigid therewith and extending forwardly centrally over the harrow with its front end deflected down and joined to and connecting the inner portions of the front portions of the frames of said sections, whereby the sections are free to play vertically and independently at their rear portions, and a draft connection extending forwardly and downwardly to said draft attachments from an elevated point of said tongue.

12. A two or more section harrow, in combination with a wheeled attachment provided with supports extending horizontally and centrally of each section, respectively, with a wheel in rear of the center of the section, the front ends of said supports loosely joined to their respective sections at intermediate points about at the centers of the length of the sections, whereby the sections are allowed vertical play independent of other and said supports, without lifting the wheeled attachment, said supports arranged to limit the downward movement of and to support the rear ends of the sections.

13. A harrow, in combination with a wheeled attachment having a support loosely coupled to the harrow and in rear of said coupling arranged beneath a tooth-bar to limit the downward movement thereof when the teeth are in or out of the soil, substantially as described.

14. The combination with a harrow of an independent riding attachment having a rigid draft-tongue extending forwardly to the front of the harrow and connected to the draft appliances of the harrow and connected at its rear axle to carrying-wheels, with supporting projections extending forward from the axle beneath the plane of the harrow-frame and into engagement with the rear of the harrow, substantially as set forth.

15. A rocking tooth-bar harrow having front depending frame-supports, in combination with a wheeled attachment having a support at the after part of the harrow and extending forwardly and loosely coupled at an intermediate portion of the harrow so that the rear portion of the harrow settles down on the support, substantially as described.

16. A harrow, in combination with a wheeled attachment having a support extending beneath a part of the harrow and at its front end loosely coupled to the harrow, substantially as described.

17. A harrow, in combination with a wheeled attachment having a support coupled to the harrow and from thence extending rearwardly beneath a part of the harrow and at its rear end having a supporting-wheel at the after part of the harrow, substantially as described.

18. A harrow comprising two or more distinct sections having curved spring-teeth, and adjusting means for elevating the same, and ground-supports for the sections, in combination with a wheeled riding attachment arranged in rear of both sections and having supports extending forwardly thereof and loosely coupled to an intermediate part of each section, so that the sections when working are free to play vertically independently of each other and of the riding attachment, and whereby when the teeth are elevated or depressed said support automatically upholds and partially supports the sections from the ground, and a rigid draft-tongue from the support extending forwardly and connected to the draft appliances of the harrow, whereby the draft of the support is through said tongue, substantially as described.

19. A harrow, in combination with a wheeled support extending forwardly and coupled to the harrow by an elongated clevis, and a draft attachment from the support to the draft devices at the front of the harrow, substantially as described.

20. A harrow having a wheeled riding attachment connected with the draft of the harrow and extending beneath a part thereof within the frame or body of the harrow, whereby the riding attachment limits the downward movement of the harrow and automatically holds the same above the ground when the teeth are elevated or depressed, and depending shoes for the harrow.

21. A harrow having two or more distinct sections provided with depending shoes, and draft attachments, in combination with wheeled attachments arranged centrally of the respective sections and each comprising a substantially horizontally-disposed support at its front end pivotally supported midway of the section, whereby when the harrow-teeth are elevated the sections are supported by their respective supports, and a rigid draft-tongue extending forwardly and connected with the draft of the harrow.

22. A curved spring-tooth harrow-section having front depending ground-supports and a wheeled attachment having supporting-wheels and a horizontally-disposed support extending forwardly beneath the section and at its front end coupled thereto pivotally at about the center of the length of the section, substantially as described.

23. A harrow provided with lever and curved spring-teeth and a depending support, in combination with a wheeled attachment having a support horizontally arranged beneath the harrow-frame, substantially as set forth.

24. A lever spring-tooth harrow having a depending support in combination with a riding wheeled attachment provided with a driver's seat and rigid draft connection, and having a support horizontally arranged beneath the harrow-frame, substantially as set forth.

25. A harrow provided with curved spring harrow-teeth and a depending support, in combination with a wheeled riding attachment having a support horizontally arranged beneath the harrow-frame, and an elevated driver's seat supported above the plane of the harrow.

In testimony whereof I affix my signature in presence of two witnesses.

EFFINGER E. WHIPPLE.

Witnesses:
HANNAH M. WHIPPLE,
FENNIMORE WHIPPLE.